United States Patent
Zuurbier et al.

(10) Patent No.: US 6,484,100 B1
(45) Date of Patent: Nov. 19, 2002

(54) SEISMIC SURVEYING

(75) Inventors: Nico Zuurbier, Heggedal (NO); Helge Bragstad, Barums Verk (NO)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/381,191

(22) PCT Filed: Mar. 19, 1998

(86) PCT No.: PCT/IB98/00411

§ 371 (c)(1),
(2), (4) Date: Sep. 16, 1999

(87) PCT Pub. No.: WO98/43117

PCT Pub. Date: Oct. 1, 1998

(30) Foreign Application Priority Data

Mar. 20, 1997 (GB) ............................................. 9706204

(51) Int. Cl.[7] ........................................... G06F 169/00
(52) U.S. Cl. ............................................. 702/3; 702/14
(58) Field of Search ................................. 702/3, 14, 16; 367/55, 53

(56) References Cited

U.S. PATENT DOCUMENTS 5,450,370 A * 9/1995 Beasley et al. ................ 367/53
5,568,385 A * 10/1996 Shelton ....................... 364/420

OTHER PUBLICATIONS

R. H. Brune, "Comprenhensive Analysis of Marine 3–D Bin Coverage.", Jul. 1, 1994, Leading Edge, vol. 13, #7 pp. 757 to 762.*

D. George, "Data Compression Breakthrough Makes Real Time Seismic Evaluation A Reality", Mar. 1, 1996, Offshore, vol. 56, #3, All pages.*

* cited by examiner

*Primary Examiner*—Edward Lefkowitz
*Assistant Examiner*—Victor J. Taylor
(74) *Attorney, Agent, or Firm*—David S. Figatner; Williams, Morgan & Amerson, P.C.

(57) ABSTRACT

A seismic surveying method and system are disclosed. The method provides a remote display representative of the quality of the coverage of a seismic survey. The method includes progressively building up at the site of the survey a first data base of data required for said display and relating to the area being covered by the survey, concurrently transmitting the data being used to build up the first data base via satellite link to a first remote location, to build up a duplicate of the first data base at said first remote location, providing access to said first remote location for the receipt of display requests from further remote locations, and in response to such requests, processing the data of said duplicate data base to provide processed data for producing said display, and compressing said processed data and transmitting it to such a further remote location for reconstitution and display thereat.

14 Claims, 2 Drawing Sheets

SEISMIC SURVEYING

FIELD OF THE INVENTION

This invention relates to seismic surveying, and is more particularly but not exclusively concerned with methods and systems for providing a remote display representative of the coverage of a marine seismic survey while the survey is being carried out.

DESCRIPTION OF RELATED ART

In order to perform a 3D marine seismic survey, a plurality of seismic streamers, each typically several thousand metres long and containing arrays of hydrophones and associated electronic equipment distributed along its length, are towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones in the streamers, digitised and then transmitted to the seismic survey vessel, where they are recorded and at least partially processed with the ultimate aim of building up a representation of the earth strata in the area being surveyed.

One form of processing normally carried out on board the seismic survey vessel is processing to determine the coverage of the survey.

Thus the area of the survey is divided into cells, typically on a rectangular grid, each associated with a respective "bin" in which data relating to the cell is accumulated. As the survey processes, the seismic survey vessel tows the streamers to and fro along a number of spaced parallel lines that effectively form part of the rectangular grid, and that define continuous, or even slightly overlapping, parts of the area covered by the grid. At the same time, a dedicated processing system on board the vessel continuously calculates, from GPS-based positional information defining the respective positions of the source and hydrophone arrays at the time of each activation of the source, in which the respective reflection point (also known as the "common mid-point" or CMP) giving rise to each trace produced by each hydrophone array lies, so that each trace can be assigned to the correct bin.

This on-board processing system builds up, substantially in real time, a data base containing the number of CMPs in each bin, along with their offset distribution (offsets being the respective distances between the source and the respective hydrophone arrays having CMPs in the bin). From this data base, several extremely informative displays are produced on the vessel, again substantially in real time, for example displays which show in contrasting colours those bins which contain less than a desired minimum number of CMPs and/or a high proportion of CMPs with large (or selected) offsets. Such displays are extremely useful for determining the coverage of the survey, and in particular, those parts of the area of the survey which may need to be "filled in", ie surveyed again.

SUMMARY OF THE INVENTION

Although this dedicated on-board processing system provides extremely useful information, in real time, to the survey crew on the vessel, it would be advantageous if the same information could be made available remotely, also substantially in real time, eg to the client who commissioned the survey.

It is an object of the present invention to provide such remote availability, and in a manner which is capable of being made highly secure.

According to a first aspect of the present invention, there is provided a method of providing a remote display representative of the quality of the coverage of a seismic survey, the method comprising the steps of:
- (a) progressively building up at the site of the survey a first data base of data required for said display and relating to the area being covered by the survey;
- (b) concurrently transmitting the data being used to build up the first data base via satellite link to a first remote location, to build up a duplicate of the first data base at said first remote location;
- (c) providing access to said first remote location for the receipt of display requests from further remote locations; and
- (d) in response to such a request, processing the data of said duplicate data base to provide processed data for producing said display, and compressing said processed data and transmitting it to such a further remote location for reconstitution and display thereat.

According to another aspect of the invention, there is provided a system for providing a remote display representative of the quality of the coverage of a seismic survey, the system comprising:
- (a) means for progressively building up at the site of the survey a first data base of data required for said display and relating to the area being covered by the survey;
- (b) means for concurrently transmitting the data being used to build up the first data base via satellite link to a first remote location;
- (c) means for receiving the transmitted data and building up a duplicate of the first data base at the first remote location; and
- (d) processing means at the first remote location for processing the data of said duplicate data base to provide processed data for producing said display, said processing means including means responsive to requests from further remote locations to provide and compress such processed data and transmit it to such further remote locations for reconstitution and display thereat.

In preferred implementations of either aspect of the invention, the data required for said display includes data related to the number of CMPs, and/or data related to offset distribution, per unit area of the area being surveyed.

FIG. 2 shows a flowchart 200 illustrating a method of one embodiment of the present invention. The method involves progressively building up at the site of the survey a first data base of data required for the display and relating to the area being covered by the survey (at 210). The data being used to build up the first data base is concurrently transferred via satellite link to a first remote location, to build up a duplicate of the first data base at the first remote location (at 220). The method also provides access to the first remote location for the receipt of display requests from further remote locations (at 230), and in response to such requests, processes the data of the duplicate data base to provide processed data for producing the display and compresses the processed data for transmission to such a further remote location for reconstitution and display thereat (at 240).

Advantageously, at least part of a program used for said processing is transmitted to said further remote location along with said compressed data, to permit further processing at said remote location.

Conveniently, said processing is performed using a Java application program.

Preferably, access to said first remote location is protected, eg by requiring the use of a user-name and password, or a digital client certificate, or a smart card or other physical security device (or "dongle"), while communication between said first remote location and said further remote location is preferably encrypted.

DETAILED DESCRIPTION OF THE INVENTION

Figure 1:
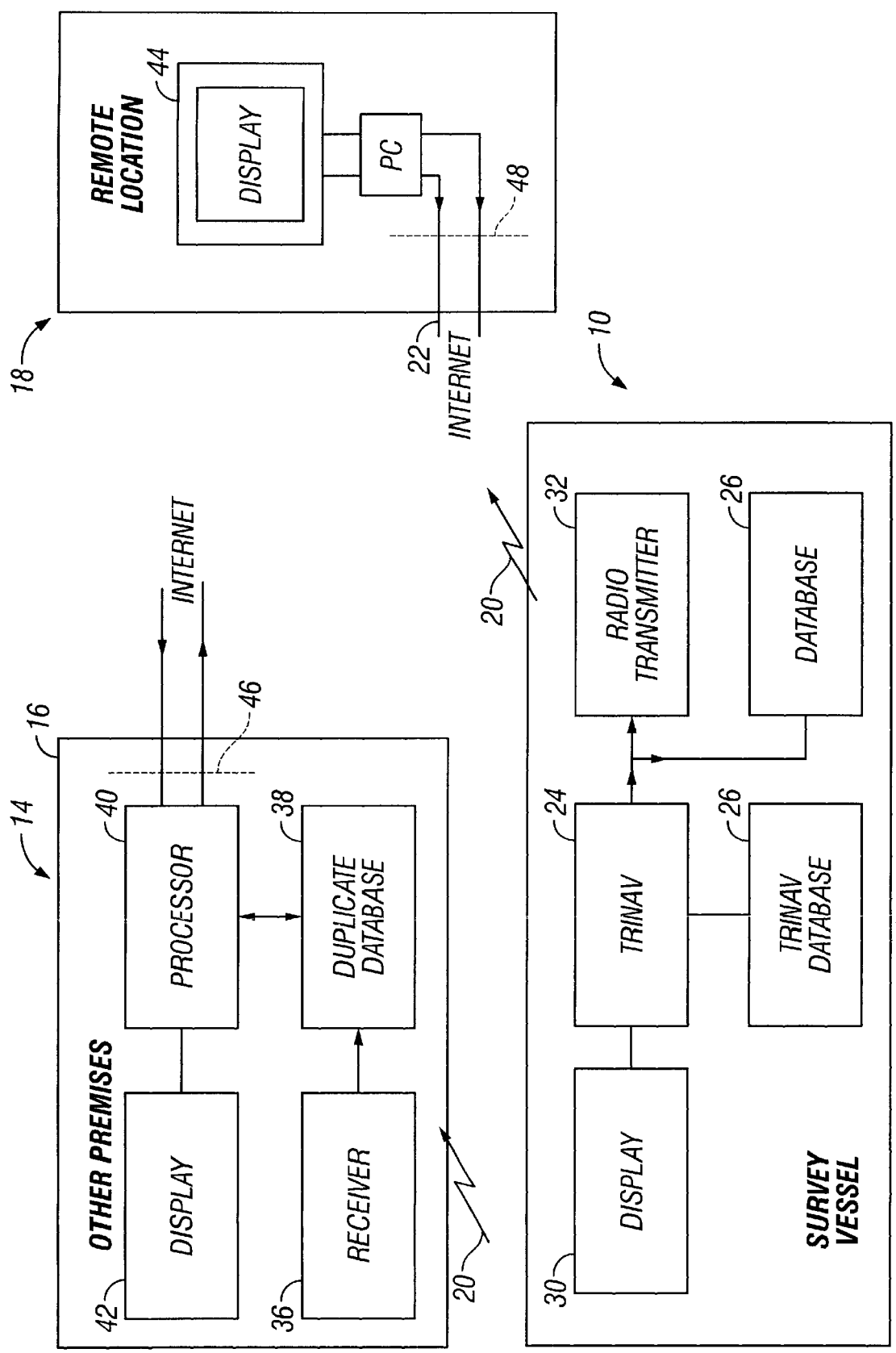
FIG. 1 illustrates a block diagram of a system programmed and operated in accordance with one embodiment of the present invention.
Figure 2:
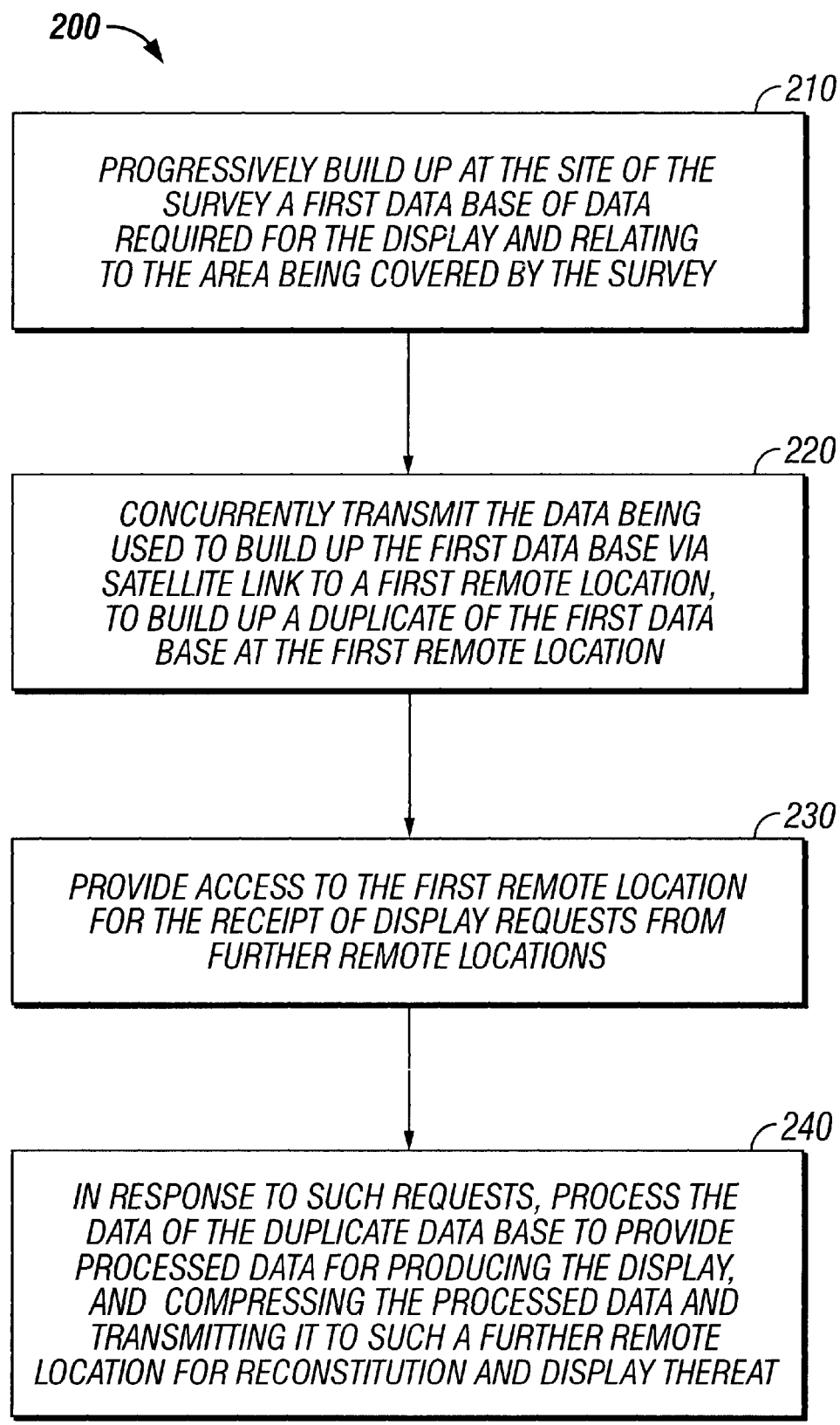
FIG. 2 shows a flowchart illustrating a method of one embodiment of the present invention.

The invention will now be described, by way of example only, with reference to the accompanying drawing, which is a simplified schematic block diagram of a system in accordance with the present invention for providing a remote display of the quality of the coverage of a marine seismic survey.

The system shown in the drawing consists of two separate parts: a first part 10, disposed on a seismic survey vessel 12 performing a marine seismic survey; and a land-based second part 14, typically located in an office or other premises 16 of the service company operating the vessel 12. These two parts cooperate as will hereinafter be described to provide remote displays relating to the seismic survey at remote locations, one of which is indicated at 18 in the drawing, and which are typically located in an office or other premises of the client who commissioned the seismic survey. The first part 10 on the vessel 12 communicates with the second, land-based, part 14 via a satellite radio link 20, while the second part 14 communicates with the remote locations like the location 18 via the Internet or the public telephone network, indicated at 22.

As already mentioned in the introduction hereto, the area of the survey is divided into cells, each typically 12.5m× 12.5m, on a rectangular grid of rows and columns, each cell being associated with a respective bin in which seismic data relating to the cell is accumulated, or "stacked". As the survey progresses, the coverage of the survey is continuously determined by a processing system on board the vessel 12. This dedicated processing system is indicated at 24 in the drawing, and may be constituted by the Applicant's TRI-NAV Integrated Navigation System. The processing system 24 not only continuously calculates the respective positions of the source, the hydrophone arrays and the CMPs therebetween at the time of each activation of the source, storing the results of these calculations in a multigigabyte main data base 26, but also continuously determines the coverage of the survey by calculating the number of CMPs falling in each bin (which number is sometimes also referred to as "fold"), along with the respective offset group (ie range of offsets) in which each trace having a CMP in the bin lies. The calculated coverage data builds up in a coverage data base 28, typically amounting to 50–100 megabytes for a complete survey, from which it can be read and processed to produce various coverage displays on a display unit 30 on the vessel 12, preferably using a Java application program. Typically the principal display shows the bins of the area of the survey in various colours, one colour for bins with a fold of, say, 10 or more, with respective different colours for folds of, say, 8, 6, 4, 2 and zero. Other displays can be based on the offset groups represented in each bin.

These coverage displays, which build up in near real time as the survey progresses, are very useful for enabling decisions to be made on the vessel 12 as to whether parts of the survey area should be re-shot or filled in. However, to enable the client who commissioned the survey to take part in the decision-making process, the present invention comes into play.

Thus the calculated coverage data being entered into the coverage data base 28 is simultaneously fed to a radio transmitter 32, from which it is transmitted over the aforementioned satellite radio link 20 to the land-based part 14 of the system.

In the land-based part 14 of the system, the transmitted coverage data is received by a receiver 36, and then used to build up a duplicate coverage data base 38 substantially concurrently with and identical to the coverage data base 28 on the vessel 12. A processor 40 accesses the data in the duplicate coverage data base 38, and using the same Java application program as is used on the vessel 12, processes the data to produce on a local display 42 displays similar to those produced on the vessel 12 at the location of the land-based part 14 of the system. Typically, the processed data for the display of the whole survey area amounts to one to a few megabytes.

In order to permit client participation of the kind mentioned earlier, the processor 40 is made accessible via the Internet to the client.

Thus, assuming the client has a suitable PC or Unix workstation, as indicated at 44, connected to the Internet at the remote location 18, the client is given the Internet address of the processor 40, and a user-name and password enabling the client to log into the processor 40 from the location 18. On logging in, the client requests the processor 40 for one of the various coverage displays (eg fold distribution or offset distribution), whereupon the processor processes the coverage data currently present in the duplicate coverage data base 38, subjects it to up to 100:1 data compression and sends it to the PC 44 over the Internet along with the Java application program. The client is then able, using the Java application program, to zoom into or scroll over parts of the survey area covered by the currently available coverage data, and to decide whether certain poorly covered areas need to be filled in. This decision may well be based on information available to the client from prior surveys or exploration drilling, but not available to the personnel carrying out the current survey on the vessel 12, which is why it is particularly advantageous to provide the client with remote access to the coverage data in near real time.

Security is provided not only by the user-name and password protection mentioned earlier, but also by firewalls 46, 48 at each party's connection point to the Internet, and by encryption of the requests, commands and data transmitted between the parties over the Internet. As an alternative to the user-name and password protection, access can be arranged to require a digital client certificate or a physical security device (or "dongle"), eg in the form of a smart card.

Although the specific embodiment of the invention described herein deals with the coverage of the survey in the narrow sense of fold distribution and offset distribution throughout the bins making up the area of the survey, the invention is not so limited. Thus the term "quality of the coverage" as used herein is intended to mean the quantitative quality of an attribute of the data associated with particular portions, such as bins, of the area of a seismic survey.

What is claimed is:

1. A method of providing a remote display representative of the quality of the coverage of a seismic survey, the method comprising the steps of:

(a) progressively building up at the site of the survey a first data base of data required for said display and relating to the area being covered by the survey;

(b) concurrently transmitting the data being used to build up the first data base via satellite link to a first remote location, to build up a duplicate of the first data base at said first remote location;

(c) providing access to said first remote location for the receipt of display requests from further remote locations; and (d) in response to such requests, processing the data of said duplicate data base to provide processed data for producing said display, and compressing said processed data and transmitting it to such a further remote location for reconstitution and display thereat.

2. A method as claimed in claim 1, wherein said data required for said display includes data related to the number of CMPs per unit area of the area being surveyed.

3. A method as claimed in claim 2, wherein said data required for said display includes data related to offset distribution per unit area of the area being surveyed.

4. A method as claimed in claim 3, wherein at least part of a program used for said processing is transmitted to said further remote location along with said compressed data, to permit further processing at said remote location.

5. A method as claimed in claim 4, wherein said processing is performed using a Java application program.

6. A method as claimed in claim 5, wherein said access to said first remote location is protected by requiring use of a password, a digital client certificate or a physical device (or "dongle") such as a smart card.

7. A method as claimed in claim 6, wherein communication between said first remote location and said further remote location is encrypted.

8. A system providing a remote display representative of the quality of the coverage of a seismic survey, the system comprising:

(a) means for progressively building up at the site of the survey a first data base of data required for said display and relating to the area being covered by the survey;

(b) means for concurrently transmitting the data being used to build up the first data base via satellite link to a first remote location;

(c) means for receiving the transmitted data and building up a duplicate of the first data base at the first remote location; and (d) processing means at the first remote location for processing the data of said duplicate data base to provide processed date for producing said display, said processing means including means responsive to requests from further remote locations to provide requests from the "further remote locations" or displaying the data at the "further remote locations" responsive to such requests.

9. A system as claimed in claim 8, wherein said data required for said display includes data related to the number of CMPs per unit area of the area being surveyed.

10. A system as claimed in claim 9, wherein said data required for said display includes data related to offset distribution per unit area of the area being surveyed.

11. A system as claimed in claim 10, wherein at least part of a program used for said processing is transmitted to said further remote location along with said compressed data, to permit further processing at said remote location.

12. A system as claimed in claim 11, wherein said processing is performed using a Java application program.

13. A system as claimed in claim 12, wherein said request responsive means includes protection means responsive to the use of a password, a digital client certificate or a physical security device (or "dongle") such as a smart card for providing access thereto.

14. A system as claimed in claim 13, wherein said request responsive means includes decryption means for decrypting received requests and said processing means includes encryption means for encrypting said processed data.

\* \* \* \* \*